United States Patent [19]

Plater et al.

[11] Patent Number: 4,685,839
[45] Date of Patent: Aug. 11, 1987

[54] FISHPLATE

[75] Inventors: Michael G. Plater, Sheffield; Kenneth Middleton, Mansfield; David B. Jackson, Retford, all of England

[73] Assignee: Hollybank Engineering Company Limited, Tuxford Nr. Newark, England

[21] Appl. No.: 904,379

[22] Filed: Sep. 8, 1986

[30] Foreign Application Priority Data

Sep. 13, 1985 [GB] United Kingdom ................. 8522669

[51] Int. Cl.[4] ............................................. E21D 15/02
[52] U.S. Cl. .................... 405/288; 405/153; 403/402; 403/403; 403/363
[58] Field of Search ............... 403/401, 402, 403, 363; 405/153, 288

[56] References Cited

U.S. PATENT DOCUMENTS 963,536  7/1910  Finlayson et al. ................... 405/153
3,126,708  3/1964  Jasper ................................... 405/288

FOREIGN PATENT DOCUMENTS 205439  9/1959  Austria ................................ 405/288
3116176  11/1982  Fed. Rep. of Germany ...... 405/153
62333  1/1955  France ................................ 403/363
2529066  12/1983  France ................................ 403/401

Primary Examiner—Andrew V. Kundrat
Attorney, Agent, or Firm—Frost & Jacobs

[57] ABSTRACT

A fishplate comprises two portions 18 and 19 which are set at 120° to each other. The fishplate has two edge portions 21,22 which are bulbous shaped and are joined by flat portion 23 in which there are rectangular apertures 24 for bolts to pass through. At the inner edge of the fishpate is a curved indentation 25 which is adapted to accommodate the junction of the RSJs forming the colliery support. Without this indentation, if the inner edge followed the line 26 the portion marked 27 would foul the RSJ beams.

The curved portion is formed in the bulbous inner edge 22. The symmetry of the fishplate enables it to be used in either the right hand or left hand position and it is so shaped that is will fit snugly into the flanges of the RSJs.

6 Claims, 4 Drawing Figures

FISHPLATE

This invention relates to a fishplate adapted to join two members which are set at an angle to each other. One specific use of the fishplate is on colliery arch supports. One such support comprises a curved or straight RSJ roof bar and two curved or straight RSJ legs. The legs meet the roof bar at an angle and one object of the present invention is to provide a fishplate suitable for joining the legs of a colliery support of this kind to a roof bar.

The fishplate embodying this invention may also be used for joining other members together where the members have to be set at a predetermined angle to each other and where it is desirable to be able to use the fishplate in either a right-handed or left-handed mode.

In accordance with the present invention, a fishplate adapted to connect two members which are at an angle to each other comprises two portions set at an angle to each other and symmetrical about a centre section line, an indentation being provided at the inner edge of the plate at the junction of the two symmetrical portions.

By making the fishplate in two parts which are symmetrical about the centre line and by providing an indentation at the edge of the plate the fishplate may be used to join members such as RSJs which have a flange which would normally foul the inner edge of a fishplate. Since the fishplates are symmetrical they can be used either right-handed or left-handed and thus used to join either leg of a colliery support to the roof bar in the specific instance described above. The predetermined angle at which the portions of the fishplate are set is made to correspond to the angle at which the two members, such as the roof bar leg, are to be located. We prefer an angle for colliery supports of 120°. The common angle of 120° for colliery supports is one which we have found by experience to be the most useful. To have a range of fishplates capable of accepting more than one angle would be economically unviable, because of the expense of producing forge die blocks. We have, therefore, fixed the angle at 120° and can alter the profile of a colliery support by adjusting the manner in which the support members are curved.

Preferably, the longitudinal edges of the fishplate are formed with bulbous symmetrical rims so that in cross-section the fishplate has the appearance of a dumb-bell.

The indentation on the inner edge of the fishplate is preferably curved and the bulbous symmetrical rim will in this area, follow the curve of this indentation.

From another aspect, the invention comprises a colliery arch support consisting of two legs and a roof bar, the legs being set at 120° to the roof bar and being joined to the roof bar by fishplates which are formed in two portions symmetrical about a centre line and set at 120° to each other, the fishplates having bulbous edge portions and having a curved indentation at the inner edge of each fishplate to accommodate the junction between each leg and the roof bar.

Figure 1:
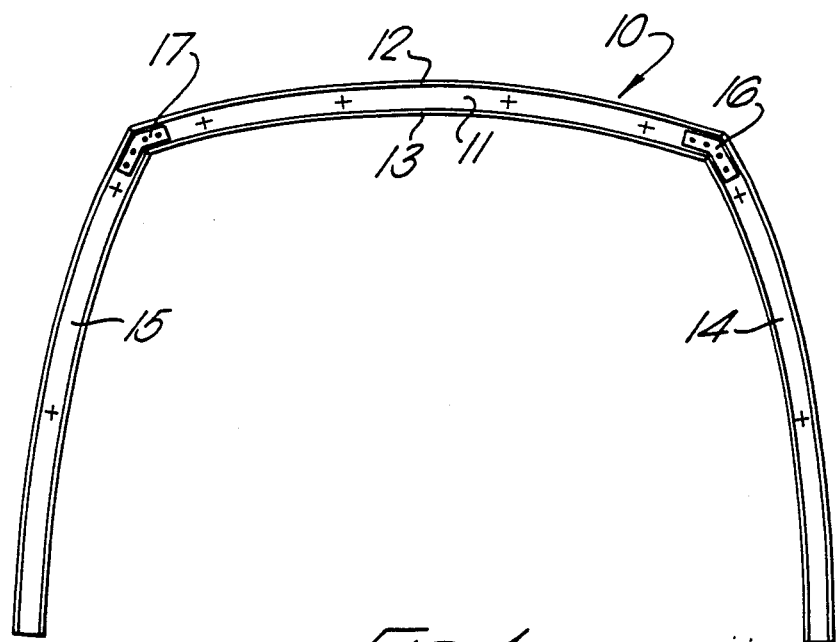
FIG. 1 shows the general arrangement of a colliery arch support in which the legs are joined to the roof bar by fishplates.

In FIG. 1, the colliery arch support comprises a 6"×5" RSJ (rolled steel joist) roof bar 10 which has a central web 11 and the conventional flanges 12 and 13. The roof bar is curved as shown and is joined by fishplates to two legs 14 and 15 fabricated from 5"×4.5" RSJ and arranged to meet the roof bar at an angle of 120°.

Figure 2:
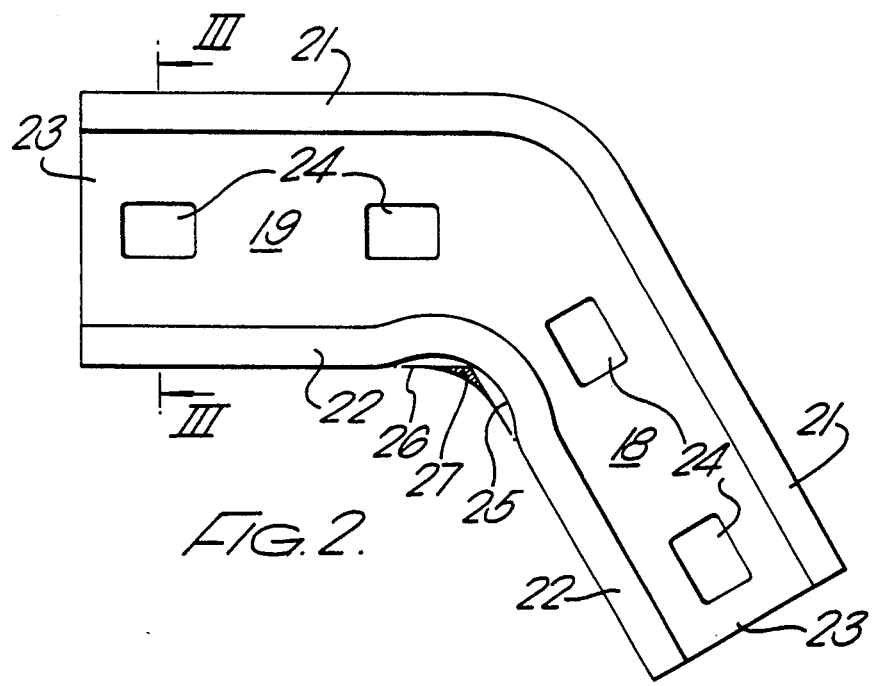
FIG. 2 is an elevation of a fishplate embodying the present invention.
Figure 3:
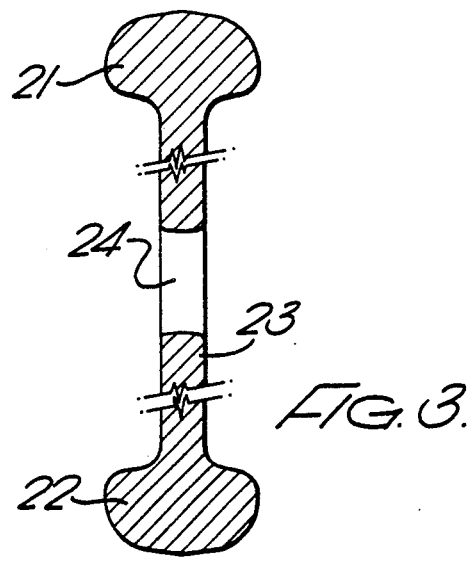
FIG. 3 is an enlarged section through the fishplate on line III—III.

Fishplates 16 and 17 are used to join the legs to the roof bar. The fishplates are shown diagrammatically in FIG. 1 but fishplates in accordance with the invention are illustrated in detail in FIGS. 2 and 3. The fishplate shown in FIGS. 2 and 3 comprises two portions 18 and 19 which are set at 120° to each other. The fishplate is symmetrical in cross section about a central vertical section line. It has two rims or edge portions 21,22, which are bulbous shaped as illustrated in FIG. 3 and are joined by flat portion 23 in which there are rectangular apertures 24 for bolts to pass through. At the inner edge of the fishplate is a curved indentation 25 which is adapted to accommodate the junction of the RSJs forming the colliery support. Without this indentation, if the inner edge followed the line 26 the portion marked 27 would foul the RSJ beams.

It will be noted that the curved portion is formed in the bulbous inner edge 22. It will be seen that the symmetry of the fishplate enables it to be used in either the right hand or left hand position shown in FIG. 1 and it is so shaped that it will fit snugly into the flanges of the RSJs.

Figure 4:
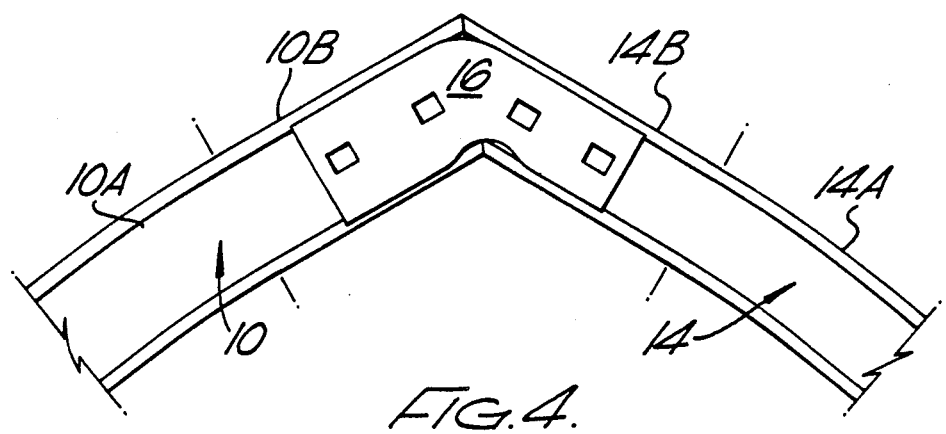
FIG. 4 is an elevation of a fishplate embodying the invention when used to join a leg to a roof bar in a colliery arch support.

The fishplate embodying this invention can thus connect straight members whose central axes meet at a point and are at a fixed angle in the same plane and will also connect members of dissimilar section. The illustration in FIG. 4 shows that the portion 14B of the leg 14 is straight and it is the portion 14A remote from the ends of the leg which is curved. Similarly the portion 10B of the roof bar 10 is straight and the portion 10A curved. Thus the fishplate 16 in effect connects straight members 14B and 10B only rather than the curved portions. The legs and the roof bar can be curved at areas remote from the ends 10B and 15B or they can be straight.

Although described in relation to a colliery arch support, the fishplate according to the invention may be used in many other forms of structural steelwork where it is desired to have a fishplate which is capable of connecting two members at an angle to each other and which is capable of being used in either a right hand or left hand configuration.

We claim:

1. A fishplate, adapted to connect two members which are at an angle to each other, the fishplate comprising two portions set at a predetermined angle to each other and symmetrical in cross-section about a centre section line, the plate having an inner edge and an indentation being provided at the inner edge of the plate at the junction of the two symmetrical portions, and wherein the longitudinal edges of the fishplate are formed with bulbous symmetrical rims so that in cross section the fishplate has the appearance of a dumb-bell.

2. A fishplate according to claim 1 and in which the predetermined angle at which the portions of the fishplate are set corresponds to the angle at which the two members are to be located.

3. A fishplate according to claim 1 adapted for use with members in the form of colliery supports in which said predetermined angle is 120°.

4. A fishplate according to claim 1 and in which the indentation on the inner edge of the fishplate is curved and the bulbous symmetrical rim in the area of the indentation follows the curve of the indentation.

5. A colliery arch support consisting of two legs and a roof bar, the legs being set at a predetermined angle to the roof bar, fishplates joining the legs to the roof bar, said fishplates being formed in two portions symmetrical in cross-section about a centre line and set at said predetermined angle to each other, the longitudinal edges of said fishplates having bulbous symmetrical rims so that in cross-section each fishplate has the apperance of a dumb-bell, and having a curved indentation at the inner edge of each fishplate to accommodate the junction between each leg and the roof bar.

6. A colliery arch support according to claim 5 and in which said angle is 120°.

* * * * *